Patented Aug. 15, 1933

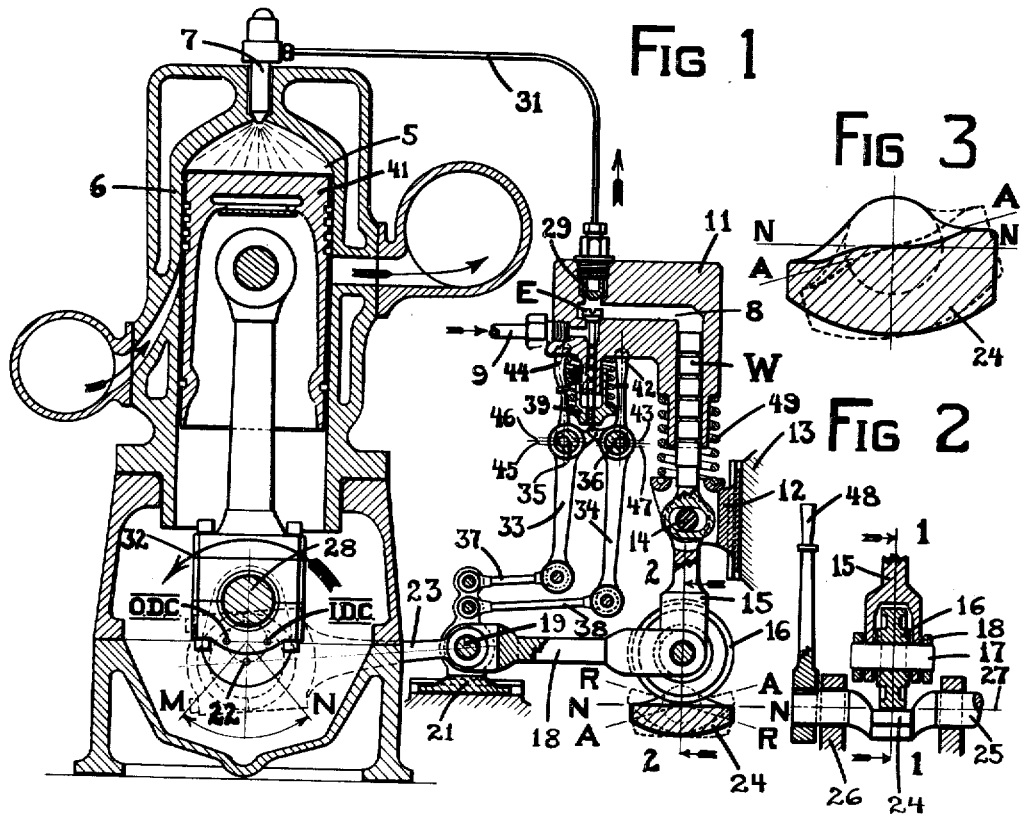
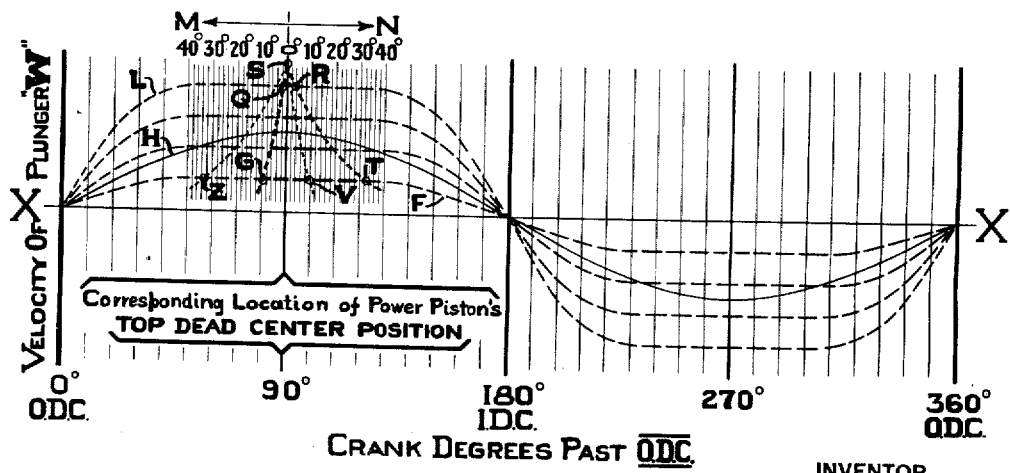

1,922,538

UNITED STATES PATENT OFFICE 1,922,538

FUEL INJECTING PUMP FOR DIESEL AND OTHER LIKE FORMS OF SELF-IGNITION ENGINES EMPLOYING AIRLESS- OR "SOLID"-INJECTION OF LIQUID FUEL SUBSTANCES

Joseph C. Groff, New York, N. Y.

Application June 28, 1927. Serial No. 201,986

17 Claims. (Cl. 123—139)

The present invention relates to internal combustion engines of the injection- or Diesel type and more particularly to fuel injecting pumps for these or other like forms of internal combustion engines which employ airless-injection of liquid fuel substances.

An object of the present invention resides in the provision of a fuel-supplying and injecting pump which is characterized by novel features which cooperate to the general end that liquid fuel may be thereby injected directly into the combustion space proper without employing such objectionable supplementary injecting or combustion-regulating devices as mechanically-operated injection valves, pre-combustion chambers, hot-bulbs, retort-tubes, or the like.

A further object of the present invention resides in the provision of means whereby the rate of fuel injection, or, what is the same thing, the relative velocity of passage of the fuel through the spray nozzles of the fuel-injector, may be controlled or adjusted to have any desired value within certain desired pre-determined working limits, and irrespective of the running speed of the engine and/or of the said operatively attached and thereby driven fuel-pumping means.

A further object of the present invention resides in the provision of means whereby the rate of fuel injection into the power-cylinder combustion spaces, as affected by a directly-connected engine driven fuel-injecting pump, may be substantially constant, or, sustained substantially uniform during the period of injection and irrespective of the relative rate of injection of the fuel by said pumping means.

A further object of the present invention resides in the provision of spray nozzle velocity control means whereby an airless-injection oil-engine may be started up from a standstill under more ideal fuel atomizing conditions than heretofore; be maneuvered to operate over a widely extending range of running speeds; and be reversed, with more facility and with more reliable positiveness than has heretofore been afforded by previous forms of airless-fuel-injection systems.

A further object of the present invention resides in the provision of automatic yet positively acting means to insure: that a two-cycle oil-engine shall be able to operate only in one and the intended direction of rotation, as determined by an ordinarily given adjustment of the control throttles; and, that the possibility of reversal of the direction of engine operation, due to incorrect timing of fuel-injection, may be eliminated.

According to the present invention the aforementioned objects are achieved by novel provisions which are incorporated within, or else directly associated with, the fuel-injecting pump itself. That is to say, the usual supplementary cam-operated and remotely located (from the injecting pump) fuel-injecting valves, which have been necessarily employed in previous injection systems to secure the afore-mentioned desirable features, are dispensed with. The means for achieving control or adjustment of injection-regulation are embodied within the said fuel-injecting pump, to thereby permit the use of automatically-acting injection valves, and thus to greatly simplify the injecting system as a whole without any sacrifice in its resultant efficiency of performance.

Other and more detailed objects and advantages of the present invention will be hereinafter pointed out in the accompanying specification and claims, and/or shown in the drawing which by way of illustration, shows what I now consider preferred embodiments of my invention.

In the drawing:

Fig. 1 shows a transverse cross-sectional view of an improved form of airless-injection fuel-pumping and injection-regulating means, and illustrates diagrammatically the substantial working arrangement of such a pump for operation with a two-cycle oil-engine.

Fig. 2 shows a longitudinal cross-sectional view of a detailed portion of the device illustrated in Fig. 1. Fig. 2 is taken substantially on line 2—2 in Fig. 1 facing in the direction of the arrows.

Fig. 3 shows a sectional view of a modified form of a detailed part of the device illustrated in Figs. 1 and 3, but in an enlarged scale. Fig. 3 is taken in the same plane as Fig. 1.

Fig. 4 shows certain specific illustrative performance curves which show diagrammatically substantially the working actions of my novel fuel-injecting mechanism.

It should be understood that adaption of the present invention is not limited to two-cycle oil engines, but is also equally well adapted for use with four-cycle engines with the usual modification involving the use of a half-speed driving means. That is to say, the power crank 28 would revolve twice as many times in a given period as the fuel-pump driving crank 22, in the case of such a pump operating with a four-cycle engine.

Referring to Figs. 1 and 2, I will now describe the working arrangement of my novel fuel injecting pump. Fuel is injected into the combustion space 5 of the power cylinder 6 through the automatic airless-type fuel-injector 7 of any suitable known form. The fuel in liquid state is supplied to the injecting pump chamber 8 through the supply-pipe 9, via the fuel pump suction-bypass valve E. Preferably, the fuel is so supplied under a relatively low, yet positive, pressure head, either by gravity feed from an overhead supply tank or by any suitable pumping means not shown in the drawing. Such positive supply of fuel is particularly advisable in the case of engines running at comparatively high speeds in order to insure that the various pump passages are completely filled with fuel in the short period of time available for such action to take place.

A fuel pumping piston or plunger W is adapted to reciprocate freely in a suitably bored-out portion of the fuel-pump-block 11. Any suitable guiding means, such as the crosshead 12 and guide 13, is preferably interposed at the point 14 of pivotal connection between the driving linklike member 15 and the fuel plunger W, in order to eliminate transmission of lateral forces to said plunger.

At some point on the aforesaid linklike member 15, though preferably at the other or lower end thereof, there is secured any suitable bearing connection such as the roller 16 which is mounted on, and so as to turn freely about the axis of, pin 17. Also attached to some point of the aforesaid linklike member 15, though preferably near or at the extreme lower end thereof as shown in Fig. 1, is an operating linklike member 18 whose forked end is interconnected with the pin 17 so as to form a pivotal connection with respect to the link 15. The other end 19 of link 18 is also pivotally connected to a guiding member 21 and to any suitable driving member such as the connecting rod 23 driven by crank 22.

The aforesaid roller 16 is adapted to rollably bear upon the surface of a suitable guiding member 24 which is mounted and supported by journallike projections 25 in the bearings 26. That is to say, the plane of the bearing surface of the guiding member 24 is adapted to be tilted at various desirable angles with respect to a "neutral" base line N—N. And preferably, the fulcrum point or axis about which such inclination of member 24 takes place is located at the intersection of the said base line N—N and of the vertical centerline indicated by 2—2 in Fig. 1.

This may be better understood by stating, that the axis about which the aforesaid adjustable inclination of member 24 takes place is preferably coincident with a line, such as 27 in Fig. 2, passing through the point of bearing contact between the outer rim of roller 16 and the guiding member 24, when the roller and driving means therefor are substantially in their midposition, or substantially in the relative position illustrated in Fig. 1.

It should be noted that the cranklike driving means 22 is preferably located substantially 180-crank degrees away from the power piston's crank 28 in the arrangement illustrated in Fig. 1. Description of the working operation of the aforesaid arrangement in Fig. 1 will hereinafter refer to such a 180-degree difference between the power and pump cranks 28 and 22 respectively. However, it should be understood that the same results may be secured by having both cranks 22 and 28 substantially coincident, as regards their angular location or relation, though not necessarily having the same extent of crank throw.

It should be understood that delivery of fuel to the aforesaid fuel injector 7, via the non-return discharge check valve 29 and the pipe line 31, takes place during upward movement of the fuel plunger W only when the suction by-pass valve E is seated in its closed position as is indicated in Fig. 1. That is to say, whenever the valve E is raised from its seat into its open position, during any period in which the fuel plunger is then moving upwards, fuel delivery through the check valve 29 is terminated abruptly by and upon such opening of the by-pass valve E, and the delivery from said plunger's subsequent upward movement is diverted out through said by-pass valve E into the fuel passages adjacent to the supply pipe 9.

Thus, the timing and duration of fuel injection to the power cylinder is preferably controlled by regulating the timing and period of closure of the suction-bypass valve E. While such control of valve E may be effected in any suitable or desirable known manner, I prefer to employ the novel regulating device illustrated in Fig. 1, and which is embodied and fully described in a co-pending patent application of mine, filed in the U. S. Patent Office March 26th, 1927, and bearing the Serial No. 178,537.

I will now briefly describe the manner in which the aforementioned injection regulating device functions, in order that the operation of my present invention may be clearly understood. Referring to Fig. 1, consider the power piston crank 28 and fuel pump crank 22 to be rotating in the ahead direction indicated by arrow 32. The crosshead member 22 is thus caused to reciprocate back and forth with the usual harmoniclike movements, which are somewhat modified of course by the influences of angularity effects of the connecting rod 23. However, it should be understood that the said crosshead member 21 always moves in fixed and unchanged timing relation with respect to the power piston 41 and irrespective of the engine speed and/or of the direction of engine rotation.

As provided in the aforementioned co-pending application, two bell-cranklike members 33 and 34 are pivotally supported on separate and eccentrically adjustable fulcrums 35 and 36 respectively, and are arranged to be given oscillatory movements thereabout by means of the two connecting links 37 and 38 respectively. Thus, and the bellcrank members 33 and 34, driven by and from the crosshead 21, do likewise always oscillate in fixed and unchanging timed relation with respect to the power piston 41.

Accordingly, for ahead rotation or operation of the engine and attached fuel injecting pump, and with the parts in the relative positions substantially as shown in Fig. 1, the projection on bellcrank 34 has just previously permitted the tappet 39, and the suction-bypass valve E attached thereto, to drop into its closed position. As previously mentioned and as will be explained hereinafter, this occurs at a time during which the fuel plunger W is moving upwards to displace fuel, and cause injection of same into the power cylinder just so long as valve E is closed. Thus, fuel injection continues until the similar projection on bellcrank 33, which meanwhile is being swung in a counter-clockwise direction about center 35 to cause said projection to be moving in an upwardly direction, encounters the aforementioned tappet 39 and thereby opens the valve E to cause abrupt termination of the injection period.

It should be clearly understood that the quantity of fuel delivered to the injecting valve 7 by the pump plunger W, without adjustments being made to influence other variable factors which will be hereinafter described, is governed solely by varying the instant at which the by-pass valve E is positively opened by the regulating gear or, for ahead operation, by the bellcrank 33.

Thus for ahead operation of the engine and pump, as indicated by arrows 32 in Figs. 1 and 4, desirable variation or adjustment of the timing of injection commencement is secured by angular movement of control lever 42. This has the effect of adjusting the vertical position of the eccentrically mounted fulcrum 36 through the limited range which is substantially indicated by 43 in Fig. 1.

Similarly desirable variation or adjustment of the timing of injection termination is secured by angular movement of control lever 44 which has the effect of adjusting the position of the eccentrically mounted fulcrum 35 vertically through the range substantially indicated by 45 and with respect to the tappet 39 of valve E.

Thus, governing of the engine in accordance with changes in load, and by means of varying the quantity of fuel injected by the pump, is preferably effected by corresponding angular movements of control lever 44 (for ahead operation only). This may be accomplished either by hand adjustment of said lever 44 or by means of any suitable automatic governing devices connected thereto but not shown in the drawing.

Reversal of direction of operation of the engine, to operate in a direction opposite to that indicated by arrows 32, is accompanied and effected by automatic interchange of the respective operating functions of the injection regulating bellcrank members 33 and 34. That is to say, while rocker 34 and lever 42 control the timing of injection commencement, and rocker 34 and lever 44 the timing of injection termination for ahead operation as previously mentioned, these functions are respectively interchanged for reversed operation. In other words, for reversed operation in the astern direction, rocker 33 has its eccentrically mounted fulcrum 35 adjusted by lever 44 through a vertical range indicated substantially by 46 to control the timing of injection commencement. And similarly, angular adjustment of lever 42, to move eccentrically mounted fulcrum 36 through a vertical range indicated substantially by 47, effects any desirable variation in the timing of injection termination or cut-off for such reversed operation.

It should be noted therefore, that reversal of the direction of engine operation from one direction to the opposite direction must be accompanied by and can only be secured through proper change in the relative settings or angular positions of both of the respective control levers 42 and 44.

It is extremely desirable if not absolutely necessary to be able to vary or adjust the timing of injection commencement in order that the engine be adapted to operate over a wide range of running speeds, and upon any of the many different commercially available grades of fuel. In connection with adjustments of such timing of injection commencement, it should be understood that once properly adjusted by the operator for any given set speed of running and/or for any given grade of fuel, no further adjustment need be made unless the above conditions become changed.

Having described the working arrangement of my preferred form of fuel injecting mechanism as embodied in the present invention I will now describe in more detail certain novel phases of its operation, reference being had to Figs. 1, 2 and 4.

Considering operation of the engine in the ahead direction as indicated by the aforementioned arrows 32, the guiding member 24, upon which roller 16 rollably bears as previously mentioned, would be inclined at some angle such as is indicated by its dotted position A—A, instead of being horizontal as shown in Fig. 1 and as indicated by line N—N.

The relative slope of said inclination of member 24 determines, for any given speed of the engine and of crosshead 21 driven thereby, the rate of upward movement of said roller 16 and of plunger W. Any desirable or suitable known means, such as the control lever 48 in Fig. 2, may be employed to secure any desirable adjustments of this degree of inclination of member 24, which might well be termed a "velocity transformer".

It should be clearly understood that it is extremely desirable if not necessary to be able to adjust or vary the rate of delivery of fuel to and through the spray nozzles of the fuel-injector 7. This may be better understood by saying that proper magnitude of the velocity of passage of the fuel through the spray nozzles is almost entirely the determining factor in the attainment of efficient combustion by means of airless injecting means.

That is to say, insufficient spray nozzle velocity results in impoverished atomization of the fuel to result in delayed and inefficient combustion. And, on the other hand, excessive spray nozzle velocity produces excellent atomization, or breaking-up of the fuel, but this is done at the expense of the ability of the spray jet to penetrate sufficiently far into the combustion chamber to properly distribute and intermix the fuel and air.

Accordingly, for any given running speed of the engine, the relative inclination of the velocity transformer 24 is so adjusted as to produce the most efficient combustion with the particular grade of fuel then being used. That is to say, when the engine is operating at slow running speed the inclination or degree of slope of member 24 would be greater than when operating at full running speed. In other words, since the rate of movement of the engine driven crosshead member 21 increases directly with increasing running speeds of the engine, and vice versa, the degree of slope of the velocity transformer 24 is correspondingly adjusted to have less inclination for an increase in running speed of the engine. In this novel manner, and unlike previous fuel injecting pumps, the rate of fuel delivery from the pump may be, if so desired, maintained at some fixed value or else otherwise adjusted as may be desired irrespective of the running speed of the engine or of changes thereof.

It is also of importance to be able to maintain the rate of fuel delivery to the spray nozzles as nearly constant in value as may be possible during the period of fuel injection. That is to say, the rate of delivery, between the instant of injection commencement and the instant of injection termination, should have its maximum value at all times and said maximum value should be uniformly sustained. In other words, delivery of the fuel to the spray nozzles should be such that commencement and termination of injection are respectively effected almost instantly, the maximum rate of injection being uniformly sustained between said instants. By the term "maximum" is meant the highest rate of delivery achieved during the injection period, which according to the foregoing would also very closely approximate the average rate of delivery during said injection period.

This may be better understood by referring to Fig. 4 which shows certain typical specific illustrative performance curves of my present injecting pump as plotted in the form of a development on rectangular co-ordinates. It should be noted that ordinates extending above the neutral abscissa line X—X denote relative rates of pumping or fuel displacing action by plunger W (i. e. relative rates of instantaneous upward movement of plunger W). And similarly, ordinates extending below the line X—X denote relative instantaneous rates of deduction or sucking in of the fuel by plunger W (i. e. relative rates of instantaneous downward movement of plunger W).

Commencing at the extreme left of line X—X and progressing to the right in the direction of arrow 32 (for ahead operation of the engine), the full-lined curve H represents the varible instantaneous rates of pumping action which the plunger W would produce if it were arranged to be driven directly off and by the crosshead 21, instead of as shown in Fig. 1. That is to say, curve H indicates the variation of instantaneous rates of harmoniclike movement of crosshead 21 as driven by crank 22.

Now, while the aforesaid fluctuation in progressive instantaneous rates of movement of crosshead 21 is the same regardless of the absolute speed of the engine and/or of said crosshead 21, the absolute values or magnitudes of said fluctuating rates of movement vary directly and proportionately with the engine speed. Accordingly, in order to make clearer the description, curve H is taken as showing the absolute rates of movement of crosshead 21 corresponding to some one running speed of the engine—say full running speed.

Also, it should be clearly understood that the aforementioned "rates" of plunger W movement as indicated in Fig. 4 are relative rates only. Instead of "rates" they might be more rightly termed "velocity factors" because the absolute rate of movement of plunger W is the resultant effect determined both by the speed of the engine, as determining the speed of the motive crosshead member 21, and by the magnitude of the said velocity factor as determined by the degree of slope of the aforementioned velocity transformer 24.

The closely spaced vertically ruled section indicated by M—N in the left half of the rectangular co-ordinates of Fig. 4 corresponds to the region of pumping operation by the fuel plunger W driving crank 22 as is also indicated by arc M—N in Fig. 1.

Like or corresponding dead center positions of said driving crank 22 are indicated by the reference characters I.D.C. and O.D.C. in Figs. 1 and 4. The "corresponding location of the power piston's top dead center position" with respect to the region of injecting action M—N is substantially as indicated in Fig. 4.

Referring still to Fig. 4, dashed line curve L shows the relative rate of pumping movement of plunger W when the previously mentioned velocity transformer 24 has substantially its maximum predetermined degree of inclination, or such as is indicated by A—A in Figs. 1 and 3. Such a maximum degree of slope produces the maximum predetermined and desired velocity factor, and said maximum velocity factor would be associated with operation of the engine at its slowest running speed.

Similarly, the dashed line curve F shows the relative rate of pumping movement of plunger W when the previously mentioned velocity transformer 24 is inclined with a reduced degree of slope intermediate that of A—A and N—N. Such reduced degree of slope produces a predetermined and desirable reduced velocity factor, and said reduced or substantially minimum velocity factor would be associated with operation of the engine at its fastest running speed.

The two similar dashed line curves shown, together with innumerable other similar curves which would fall thereabout (but not shown) and intermediate said maximum velocity factor curve L and said minimum velocity factor curve F, indicate velocity factors for operation of the engine at innumerable speeds intermediate its fastest running speed and its slowest running speed.

It is of importance to note that the dashed line "velocity factor" curves L and F, as well as those intermediate, are substantially flat within the entire region M—N of injecting action. As previously mentioned and explained, such a constant or uniform rate of fuel injection, as is so indicated by the fact that the aforementioned flattened regions are substantially horizontal straight lines, is extremely desirable.

I provide novel means whereby said rate of fuel delivery may be uniformly sustained irrespective of desirable adjustments to the absolute and/or relative rate of such delivery of fuel by plunger W. Accordingly, instead of constructing the previously mentioned velocity transformer 24 to have the profile of its guiding surface sugstantially flat as shown in Figs. 1 and 2, it is constructed so as to present a tiltable guiding surface of irregular (non-flat) profile such as is substantially shown in Fig. 3.

The function of said tiltable surface of irregular profile, aside from affording novel adjustment of the rate of fuel delivery, is to automatically counteract and compensate for the variable rate of movement of the driving member 21.

It should be understood that said motive member 21 is in turn driven by cranklike means 22 and is subjected to harmoniclike variation in its progressive instantaneous rates of reciprocating movements. Accordingly, the aforesaid irregular profiled guiding surface is of such a configuration, or substantially as shown in Fig. 3, that said irregular rate of movement of member 21 is transformed into a uniform rate of movement as applied to plunger W.

In connection with statement of the exact nature or shape of said irregular configuration, it should be clearly understood that its exact shape will vary somewhat in accordance with the following determining factors: the ratio of length of link 23 to the throw of crank 22; the ratio of the respective lengths of links 15 and 18 with respect to themselves, and with respect to the first named ratio; and, the ratio of the aforementioned ratios with respect to the diameter of the bearing roller means 16.

I will now describe the novel manner in which reversal of the direction of engine operation may be carried out with my present fuel injecting pump. In Fig. 4, and first considering operation of the engine and attached pump in the ahead direction, as is indicated by arrows 32, and at full running speed, the heavy dashed line flat region G—T on the previously mentioned minimum velocity factor curve F indicates a fuel injecting period or action extending from the point of injection commencement G (illustratively shown as being 10-crank degrees prior to the T.D.C. position of power piston 41) to the point of termination T (illustratively shown as being 33-crank degrees after or past said T.D.C. position of piston 41). In other words, G—T indicates a fuel injecting action having an illustrative angular duration of 43-crank degrees.

Similarly, for ahead operation at the slowest running speed, the heavy dashed line region Q—R of the previously mentioned flattened portion of the corresponding maximum velocity factor curve L indicates a fuel injecting period extending from injection commencement at Q (illustratively shown as being 2-crank degrees ahead of the T.D.C. position of power piston 41) to the point of injection termination R (illustratively shown as being 4-crank degrees past said T.D.C. position of piston 41). Thus, Q—R represents a fuel injecting action having an illustrative angular duration of 6-crank degrees.

Accordingly, at full running speed, which usually is associated with the maximum output of power, substantially the maximum angular period G—T (on curve F) of injection is used in conjunction with substantially the minimum velocity factor.

And similarly, at slowest running speed, which usually is associated with the minimum output of power, substantially the minimum angular period Q—R (on curve L) of injection is used in conjunction with substantially the maximum velocity factor.

For operation of the engine at intermediate running speeds, with corresponding intermediate outputs of power, corresponding intermediate periods of fuel injection and corresponding intermediate velocity factors would be used to secure the utmost combustion- and operating-efficiency under all running conditions.

Furthermore, point S indicates coincidence of the respective points of injection commencement and of injection termination, and therefore, S represents absence of any injection of fuel which corresponds to the stop condition. Accordingly, the complete angular region of fuel injecting actions for all conditions of operation is substantially as is indicated illustratively by the heavy dotted curved lines S—G and S—T.

Having just considered ahead operation of the engine and attached fuel injecting pump, where the velocity transformer 24 was inclined at some slope such as A—A in Figs. 1 and 3, now consider that the engine and pump are to be stopped, by discontinuing injection of fuel to the cylinder space 5, and be reversed to start and thereupon operate in the astern direction respectively by means of any suitable known starting devices and by means of suitable readjustment of the fuel injecting pump.

Here it should be noted, that the motive crosshead member 21 has its instantaneous direction of movement instantly reversed by and upon reversal of the direction of engine operation. Consequently, upon such new reversing operation, considering driving crank 22 to be in the position shown in Fig. 1 (corresponding to the T.D.C.- or firing-position of power piston 41 for operation in either direction), and also considering member 24 to be inclined as per A—A for ahead operation, the fuel plunger W would thereupon be given a downward or sucking-in movement instead of a required fuel delivery movement upwards.

However, when operation of the engine is thus reversed from the ahead to the astern direction, the previously mentioned "velocity transformer" member 24 is accordingly tilted about its axis 27 from some ahead position A—A to some astern position R—R as indicated in Fig. 1. This tilting action is performed by the operator when reversing the engine and automatically changes the just previously mentioned wrong downward- or sucking-in-movement of plunger W into a correct and desirable upward fuel injecting movement. Thus said "velocity transformer" 24 might also well be termed a "direction rectifier".

Accordingly, referring back to Fig. 4, for astern operation of the engine and attached fuel injecting pump, substantially the same velocity factor injection curves L, F and those intermediate, are automatically produced by said "direction rectifier" 24. Furthermore, the angular phase relation of pumping action by plunger W is substantially the same with respect to power piston 41 for either and/or both directions of running operation. Here it should be noted however, that, for astern operation, the direction of advance in Figs. 1 and 4 is opposite to the direction indicated by arrows 32.

Then, for astern operation at full running speed, region V—Z on the aforementioned minimum velocity factor curve F indicates substantially the maximum angular period of injecting action for full power conditions. Said injecing action V—Z commences at the illustrative point V and terminates at the illustrative point Z.

Furthermore, point S indicates the stop condition for said astern operation just as it has been shown to do for ahead operation. Also, the complete range of injecting actions for all operating conditions is indicated substantially by the light dotted lines S—V and S—Z. In other words, region S—G—T indicates the complete range of injecting actions for ahead operation, and region S—V—Z indicates the complete range of injecting operations for reversed or astern running conditions.

In the foregoing description of the actions which take place when the engine and its attached fuel injecting pump undergo reversal of operation, it has been shown that said reversed operation of the engine, by means of power developed from the combustion of fuel injected into the combustion space 5, is impossible unless the previously mentioned "direction rectifier" 24 is properly tiltably adjusted for the new or reversed direction of running.

That is to say, inadvertent improper self-reversal of operation, an objectionable feature common to most present two-cycle engine fuel injecting devices, is positively prevented by the novel construction of my present fuel-injecting pump.

It should be understood that I do not limit embodiment of my present invention to the actual detailed construction as herein illustrated and/or described, as it will be apparent to one skilled in the art that the novel features of my invention might be equally well embodied in modified constructional arrangements.

For example: The intermediate crosshead 21, though considered advantageous, might be eliminated to combine driving links 18 and 23 into one single or extended driving member; other bearing means than the roller 16 might be employed; other means, such as any known modification of the common block (or roller) and groove arrangement, might be incorporated in member 24 to thereby cause and insure downward or return movement of plunger W than the return spring 49 in Fig. 1; other driving means than the crank 22 might be employed to motivate the said fuel injecting pump; and other injection regulating means than the preferred arrangement illustrated might be employed without departing from the broad scope of my present invention.

What I claim is:

1. Apparatus for controlling the operating relation between a Diesel engine and a fuel-injecting pump driven thereby comprising, in combination, a reciprocating member driven by the Diesel engine, a fuel-pumping piston or plunger, a link actuated by said member, another link extending at an angle thereto and pivotally connected therewith, said link being pivotally connected with said plunger, bearing means carried by said links, and a bearing surface for guiding the path of said bearing means, said bearing surface being of a configuration to create motion which will convert a variable rate of motion of said member into a uniform rate of motion of said plunger.

2. Apparatus comprising the combination set forth in claim 1 in which the bearing surface is adjustable for varying the rate of substantially uniform movement of said pumping plunger.

3. Apparatus for controlling the operating relation of a fuel-injecting pump and an internal combustion engine of the fuel injection type comprising, in combination, a reciprocating member driven by said engine, a link actuated by said reciprocating member, a fuel-pumping piston or plunger, another link pivotally connected with said link and with said pump plunger, means for controlling the movements of said links so as to produce a uniform rate of movement of said plunger regardless of variation in the rate of movement of said reciprocating member during any single complete back and forth reciprocation of the latter and means providing an adjustment for the aforesaid last mentioned means adapted to create substantially a 180 crank degree span of operating relation between said plunger and said reciprocating member.

4. A fuel pumping device for internal combustion engines of the fuel injection type, comprising in combination, a fuel injection pump, a driving means therefor operated in fixed phase relation with the engine crank shaft and reciprocating with a substantially harmonic-like movement, means intermediate the driving means and pump with provision for transforming the velocity of movement obtained from the driving means to another velocity which is to be imparted to the pump and for effecting fuel delivery at desirably selective rates of delivery each of which after selection is substantially constant during the entire period of such delivery.

5. A fuel pumping device for internal combustion engines comprising in combination, a fuel injecting pump, a driving means therefor operated in fixed phase relation with the engine crank shaft, means intermediate the driving means and pump to transform the velocity of drive imparted to the pump from the driving means for effecting fuel delivery by the pump at desirable selective rates of delivery, said means after such selection having provisions to afford fuel delivery at such selected rate and at substantially constant velocity during the entire period of fuel delivery, and means for re-establishing the driving relations of the driving means and pump to deliver fuel at the proper time for running the engine in reverse direction, said means also having provisions for maintaining the rate of fuel delivery substantially constant at selective desired rates during the entire period of fuel delivery when the engine is running in reverse direction.

6. A fuel pumping device for an internal combustion engine of the solid injection type comprising in combination, a fuel pumping device, a driving means therefor operated in fixed phase relation with the engine crank shaft and with a substantially harmonic motion, a driving connection intermediate the driving means and pumping device, and means operatively associated with the driving connection with provisions to transform the velocity of drive imparted to the pumping device to afford desired selective rates of delivery by the pumping means, said last mentioned means also having provisions for maintaining the rate of fuel delivery substantially constant after any particular rate of delivery has been selected.

7. A fuel supplying device for internal combustion engines of the injection type, comprising in combination, a fuel injecting pump, and a driving means therefor operated by the said engine into which fuel is to be injected, said driving means including a substantialy harmonically reciprocated member which is reciprocated with a fixed extent of reciprocation and with a substantially harmonic movement during the drive, a linkage connecting said member and the aforesaid pump and an adjustable velocity transforming link grinding means disposed intermediate the harmonically reciprocated member of the driving means and said fuel pump with provisions for changing the cyclic phase of action of the pump with respect to the driving means, said harmonically reciprocated member of the driving means being driven by said engine with a fixed phase relation thereto.

8. An apparatus for controlling the operation of the fuel injecting pump for internal combustion engines, having a pump chamber, a pump plunger operating therein, fuel, suction and discharge conduits, said suction conduit being in connection with the pump chamber during the first and latter period of the pump plunger stroke, and including in combination, a reciprocating crosshead adapted to be driven by the engine with a substantially harmonic motion, a pair of links, one link having one of its ends pivoted to the crosshead and the other end pivoted to the other link which in turn is pivoted to the pump plunger, said links being arranged substantially at right angles to each other, a roller carried at the point of pivotal intersection of the two links, and means cooperated with the roller for controlling the movement of the links so as to transmit a uniform rate of movement to the pump plunger.

9. The invention according to claim 8 wherein the controlling means comprises a bearing block having a cam surface thereon of such configuration as to create motion which will convert the variable rate of motion as derived from the reciprocating member into a uniform rate of motion as imparted to the plunger.

10. In a fuel supplying device for an internal combustion engine comprising in combination with an engine into which fuel is to be injected, of driving means for a fuel injecting pump which driving means is driven at all times in fixed angular relation with respect to the engine, a single plunger fuel injecting pump plunger operated by said driving means, a linkage intermediate the single plunger of said pump and the aforesaid driving means for operating the former from the latter, and bearing means tiltable about a fixed fulcrum point and cooperating with the aforesaid linkage but disposed outside of but cooperating with the operating train of said linkage for changing the character of a pumping stroke of the single plunger of said pump from one of suction to one of displacement in order to properly supply fuel for reverse rotation of the engine.

11. An apparatus for controlling the rate of travel of a fuel pumping piston of a fuel injection type of internal combustion engine comprising in combination a driven element driven by the engine and which is reciprocated with a substantially harmonic motion during its drive from the engine, means for imparting reciprocating movement to the fuel pumping piston from said driving element, said means comprising driving connections which include links pivotally connected to each other and also respectively connected to the reciprocating element and to said piston, bearing means carried by the links at their point of pivotal connection with each other, and a guiding surface upon which the said bearing means treads, which surface is disposed and related to effect reciprocating motion of said piston, and which guiding surface is adjustable for degree of inclination to vary the rate of travel of the said piston.

12. An apparatus for controlling the rate of travel of a fuel pumping piston of a fuel injection type of internal combustion engine comprising in combination a driving element driven from the engine and constantly moving with a substantially harmonic and reciprocating motion in a given path of travel, means for imparting reciprocating movement to the fuel pumping piston from said driving element, said means including a link pivotally connected with said piston, a link pivotally connected with said driving element, means pivotally connecting the two said links together, a roller carried by said links at their point of pivotal connection with each other, and means for variably guiding the path of travel of said roller to thereby control the rate of travel of the aforesaid fuel pumping piston.

13. A fuel supplying device for internal combustion engines of the injection type, comprising in combination, a fuel injecting pump, and a driving means therefor operated by the said engine into which the fuel is to be injected, said driving means comprising a member which is substantially harmonically reciprocated during the drive with substantially a harmonic movement and adjustable velocity transforming means disposed intermediate the harmonically reciprocated member of the driving means and said pump for altering the relative velocity of movement of the pump with respect to the driving means to provide substantially unchanging rate of driving movement of the pump during one harmonic motion of the driving means, said adjustment of said means including provisions to provide adjustment in the velocity of driving movement of said pump for any given velocity of driving movement of the driving means.

14. A pumping device for supplying liquid at various rates of delivery for any given frequency of drive of a main driving device, comprising in combination, a pump including a cylinder, a piston operating therein, a pumping chamber into which liquid is delivered from said cylinder and from which liquid is withdrawn into the cylinder by said piston, inlet and discharge valves for said chamber, means for driving said piston comprising a rotating drive shaft which operates at a determined number of revolutions per minute, a crank-like member driven by said shaft, a driving link connected to be driven by said crank-like member, another driving link connected with the aforesaid piston and also pivotally interconnected to said first mentioned link, bearing means disposed substantially at the point of pivotal interconnection of said links, said first and last mentioned links having an angular relation to one another, a guiding member having a surface upon which the aforesaid bearing means is adapted to roll back and forth, said surface being inclined with respect to the line of travel of the piston, and a tiltable mounting for said guiding means to provide an alterable adjustment for the aforesaid angle of inclination of said guiding member, whereby for any given speed of the driving shaft there may be effected an adjustable variation of the volume of liquid displaced by the piston per unit of time.

15. A pumping device for supplying liquid, comprising in combination, a pump including a cylinder, a piston operating therein, a pumping chamber into which liquid is delivered from said cylinder and from which liquid is withdrawn into the cylinder by said piston, inlet and discharge valves for said chamber, means for driving said piston comprising a rotating drive shaft which may operate at a variable frequency and at a variable number of revolutions per minute, a crank-like member driven by said shaft, a driving link connected to be driven by said crank-like member, another driving link connected with the aforesaid piston and also pivotally interconnected to said first mentioned link, bearing means substantially at the point of pivotal interconnection of said links, said first and second mentioned links having an angular relation to one another, a guiding member having a surface upon which the aforesaid bearing means is adapted to roll back and forth, said surface being inclined with respect to the line of travel of the aforesaid piston, and a tiltable mounting for said guiding member to provide an alterable adjustment for the aforesaid angle of inclination.

16. The invention according to claim 8 wherein the controlling means cooperating with the roller for controlling the movement of the links acts so as to transmit a substantially uniform rate of movement to the pump plunger and in which the controlling means includes a bearing surface block 24 which is tiltably adjustable to create substantially a 180° span of change of operating relation between the plunger and the engine which drives it.

17. The invention according to claim 8 wherein the controlling means cooperating with the roller for controlling the movement of the links acts so as to transmit a substantially uniform rate of movement to the pump plunger and in which the controlling means comprises a bearing block having a cam surface thereon which is adjustable for varying the rate of substantially uniform movement of the pumping plunger.

JOSEPH C. GROFF.

CERTIFICATE OF CORRECTION.

Patent No. 1,922,538.

August 15, 1933.

JOSEPH C. GROFF.

It is hereby certified that error appears in the printed specification of the above numbered patent requiring correction as follows: Page 4, line 28, for "deduction" read eduction; line 35, for "varible" read variable; and line 128, for "sugstantially" read substantially; page 6, line 129, claim 7, for "substantialy" read substantially; and line 135, for "grinding" read guiding; and that the said Letters Patent should be read with these corrections therein that the same may conform to the record of the case in the Patent Office.

Signed and sealed this 14th day of November, A. D. 1933.

F. M. Hopkins
Acting Commissioner of Patents.

(Seal)

able mounting for said guiding member to provide an alterable adjustment for the aforesaid angle of inclination.

16. The invention according to claim 8 wherein the controlling means cooperating with the roller for controlling the movement of the links acts so as to transmit a substantially uniform rate of movement to the pump plunger and in which the controlling means includes a bearing surface block 24 which is tiltably adjustable to create substantially a 180° span of change of operating relation between the plunger and the engine which drives it.

17. The invention according to claim 8 wherein the controlling means cooperating with the roller for controlling the movement of the links acts so as to transmit a substantially uniform rate of movement to the pump plunger and in which the controlling means comprises a bearing block having a cam surface thereon which is adjustable for varying the rate of substantially uniform movement of the pumping plunger.

JOSEPH C. GROFF.

CERTIFICATE OF CORRECTION.

Patent No. 1,922,538.

August 15, 1933.

JOSEPH C. GROFF.

It is hereby certified that error appears in the printed specification of the above numbered patent requiring correction as follows: Page 4, line 28, for "deduction" read eduction; line 35, for "varible" read variable; and line 128, for "sugstantially" read substantially; page 6, line 129, claim 7, for "substa..-tialy" read substantially; and line 135, for "grinding" read guiding; and that the said Letters Patent should be read with these corrections therein that the same may conform to the record of the case in the Patent Office.

Signed and sealed this 14th day of November, A. D. 1933.

F. M. Hopkins
Acting Commissioner of Patents.

(Seal)

CERTIFICATE OF CORRECTION.

Patent No. 1,922,538. August 15, 1933.

JOSEPH C. GROFF.

It is hereby certified that error appears in the printed specification of the above numbered patent requiring correction as follows: Page 4, line 28, for "deduction" read eduction; line 35, for "varible" read variable; and line 128, for "sugstantially" read substantially; page 6, line 129, claim 7, for "substantialy" read substantially; and line 135, for "grinding" read guiding; and that the said Letters Patent should be read with these corrections therein that the same may conform to the record of the case in the Patent Office.

Signed and sealed this 14th day of November, A. D. 1933.

(Seal)

F. M. Hopkins
Acting Commissioner of Patents.